Figure 1:
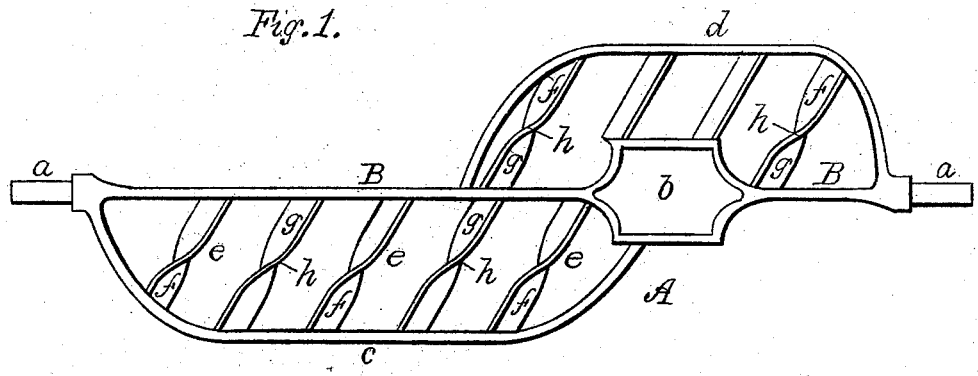

(No Model.)  2 Sheets—Sheet 1.

A. D. PUFFER.
MIXER OR AGITATOR FOR SODA WATER APPARATUS.

No. 269,959. Patented Jan. 2, 1883.

Witnesses.
H. E. Lodge
F. G. Sampson.

Inventor
Alvin D. Puffer.
F. Curtis, Atty.

(No Model.) 2 Sheets—Sheet 2.

A. D. PUFFER.
MIXER OR AGITATOR FOR SODA WATER APPARATUS.

No. 269,959. Patented Jan. 2, 1883.

Witnesses.
H. E. Lodge
F. G. Simpson

Inventor.
Alvin D. Puffer.
F. Eustis. Atty.

UNITED STATES PATENT OFFICE.

ALVIN D. PUFFER, OF MEDFORD, MASSACHUSETTS.

MIXER OR AGITATOR FOR SODA-WATER APPARATUS.

SPECIFICATION forming part of Letters Patent No. 269,959, dated January 2, 1883.

Application filed April 13, 1882. (No model.)

*To all whom it may concern:*

Be it known that I, ALVIN DAVIS PUFFER, a citizen of the United States, residing at Medford, in the county of Middlesex and State of Massachusetts, have invented certain new and useful Improvements in Mixers or Agitators for Soda-Water Apparatus; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My present invention relates to the rotary dashers, termed "agitators" or "mixers," employed in generators and receivers of apparatus for the manufacture of soda or other aerated waters to agitate the liquid contents of such generators and receivers, and compel these contents to absorb the acid precipitated into them in the generation of gas.

My said invention consists, first, in a rotary agitator or mixer for generators or receivers of aerated-water apparatus, containing, in combination with a suitable shaft, two series of vanes arranged obliquely in opposite directions to the axis of such shaft, one set being situated near the circumference of the generator and the other adjacent to the axis or shaft thereof; second, a rotary agitator for generators or receivers of aerated-water apparatus, containing a V or approximately so shaped beak to spread and disseminate the acid liquid admitted to the water in said generator; third, in agitators for generators or receivers of aerated-water apparatus, two series of vanes disposed in obliquely-opposite planes with respect to the axis of such generator and the agitator-shaft, with a space intermediate between the oppositely-inclined portions of the vanes; fourth, in agitators for generators or receivers of aerated-water apparatus, the combination, with the agitator-shaft and two sectional threads spirally surrounding such shaft, and adapted to rotate in close proximity to the inner circumference of the generator, of a series of radial blades secured to such shaft, and operating in proximity to the axis of the latter; fifth, an agitator for generators or receivers of aerated-water apparatus, consisting, in combination with a suitable shaft, of two barred wings disposed upon diagonally-opposite sides of such shaft, when the individual vanes of these wings are composed of two portions disposed in obliquely-opposite directions peripherally of the shaft; sixth, an agitator for generators or receivers of aerated-water apparatus, consisting in the combination, with a suitable shaft having an inclosure to receive the acid, as stated, of a barred wing upon the end of the shaft most remote from said inclosure, and a V or approximately shaped beak arranged in close proximity to such inclosure, all substantially as hereinafter stated.

My present invention may be considered in the light of an improvement upon an agitator shown and described in Letters Patent of the United States, numbered 231,847, issued on the 31st day of August, 1880, to A. D. Puffer. In this particular agitator the vanes are arranged in a common plane obliquely to the axis of the shaft, and the solution which is driven toward one end of the generator must find its way back as best it can, being obstructed in its return by the portions of the blades nearest the axis of the shaft, the result being that the current is sluggish, and the solution, being constantly impelled in one direction, stands at a higher level at one end of the generator than at the opposite end thereof.

Figure 5:
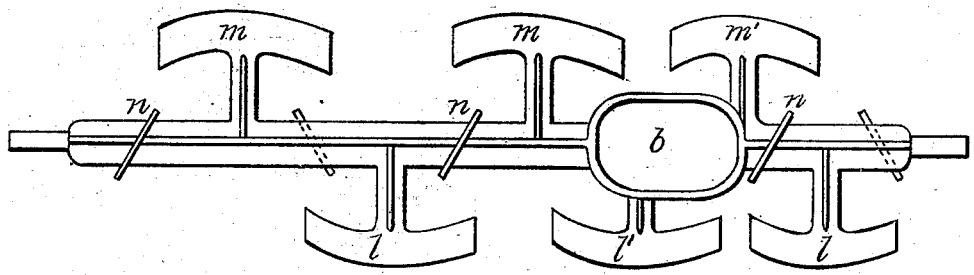
Figure 2:
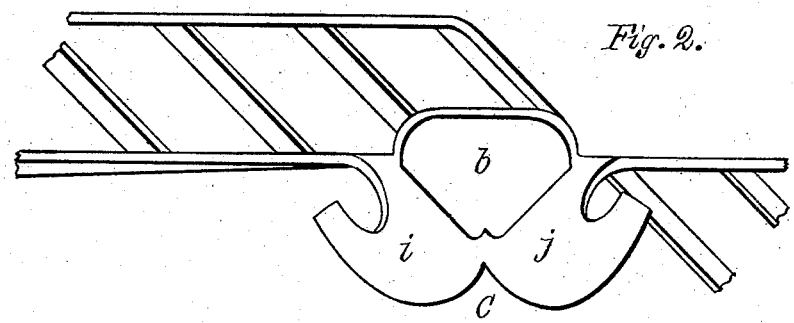
Figure 8:
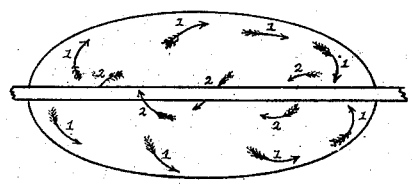
Figure 4:
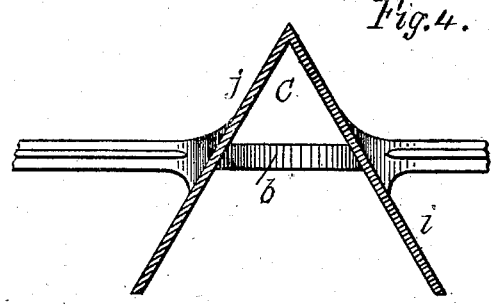
Figure 3:
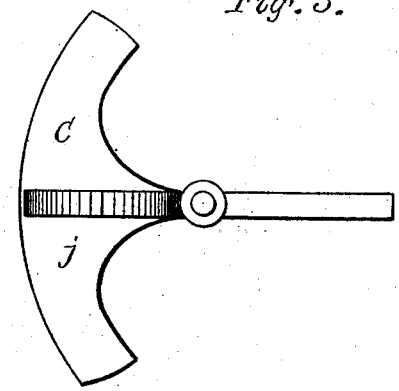

In the drawings, Figure 1 is a plan of an agitator containing certain features of my present improvements, while Fig. 2 is a plan, and Fig. 3 an end view, of the same. Fig. 4 is a cross-section showing the V-shaped beak before alluded to. Fig. 5 is a plan, and Fig. 6 a side elevation, and Fig. 7 a cross-section, of a modified construction of the vanes. Fig. 8 is a diagram showing, as far as is practicable upon paper, the direction taken by the current of liquid in the generator.

Reference being had to Fig. 1 of the above-named drawings, A will be seen to represent my improved agitator as composed of a central shaft, B, containing end journals, *a a*, for support within the generator, and a central orifice, *b*, to permit discharge of acid into the generator without coming in direct contact with the shaft, in order to protect the latter from the corrosive action of said acid. Upon diagonally-opposite sides of the shaft B, I form an outstanding arched guard-plate or fin, c or d, the space intermediate between these fins and the shaft being occupied by rigid blades or vanes e e, &c., arranged to induce circulation of water within the generator, the vanes and outlying fins constituting barred wings, and said vanes standing in one common plane. The above construction of agitator is shown in Letters Patent above named, issued to Alvin D. Puffer.

In carrying out my present improvements in one form of embodiment I employ, in lieu of the vanes arranged in a uniform oblique plane, to drive the water in one direction, as shown in the patent above referred to, a series of vanes, e e, &c., which are individually composed of double-inclined planes standing in obliquely-opposite directions peripherally of the shaft, as shown at $f g$ in said Fig. 1 of the drawings, and I prefer, in the construction of these vanes, that a small intermission or idle space, $h$, shall exist between each to exert no propelling action upon the water, for purposes hereinafter explained. The obliquely-inclined portions $f g$ of the vanes upon one side of the shaft B stand at an angle opposite to the corresponding parts of the vanes upon the opposite side of such shaft, as shown in said Fig. 1, in order that the solution in the generator shall be driven in the same general direction by each. It is true that these vanes may be allowed to stand in the same inclined planes, and the water would be more or less disturbed and circulated; but in practice I have found the arrangement shown and described to produce highly satisfactory results.

By the above-described construction of the vanes e e the water in the generator is, by means of the outer portions, $f$, of the vanes, propelled from one end to the other of the generator, about its interior circumference, generally in a spiral path, as shown by the arrows 1 in Fig. 8 of the drawings, thence by the action of the inner portions, $g$, of such vanes returned in the opposite direction centrally of the generator and practically spirally about the shaft B, as shown by the arrows 2 in said Fig. 8, thereby inducing a strong continuous current and active circulation of the body of the solution.

The idle or inactive portions $h h$, &c., of the vanes or blades exert no propelling action upon the water. Hence a contracted body of comparatively still water—that is, an eddy—exists between the two portions of the general current. This is by no means essential to the operation of my device; but I prefer it as tending to reduce friction between the contending currents, and lessening the power required to rotate the agitator.

In Figs. 2, 3, and 4 of the drawings I have shown the agitator with one of its barred wings omitted, and the employment, in lieu of such wing, of a wedge or V shaped beak, C, composed of two vanes, $i j$, secured obliquely at practically equal angles to the shaft B and converging to a point, $k$, which is in advance as the shaft rotates, these vanes $i j$ diverging at rear to produce the V, as shown.

I prefer that the vanes $i j$, constituting the V-shaped beak, shall also constitute one side of the opening $b$ in the agitator-shaft, as shown in Fig. 3, in order that the acid admitted from the vessel above to the generator over this opening $b$ shall be instantly spread by such beak and distributed or disseminated throughout the body of the solution in the generator, and thoroughly diluted thereby, in order generally to protect the agitator against direct contact with the acid, but more especially the portion of the agitator immediately below the point of entrance of the acid. Much better results are also thereby obtained from the same materials.

The V or approximately so shaped beak C, in addition to cleaving and spreading the acid, as stated, also operates to intermittently lift and return certain portions of the contents of the generator, which tends to generally aid in the absorption of the acid by such contents by breaking up and subdividing the two.

I do not restrict myself to the precise geometrical form or configuration of the beak C as represented by two straight sides of a triangle, as shown in Fig. 2 of the accompanying drawings, as this arbitrary form may be easily departed from without losing sight of the spirit and intent of this feature of my improvements, which I consider to consist in such a disposition or arrangement of vanes that the water, marble-dust, and acid together shall be spread and disseminated, or both spread and at times lifted and permitted to fall back, as stated. For instance, the beak may approximate a U form with curved sides diverging at rear, which would yield practically similar results, though not perhaps to the same extent as the V shape.

Figure 6:
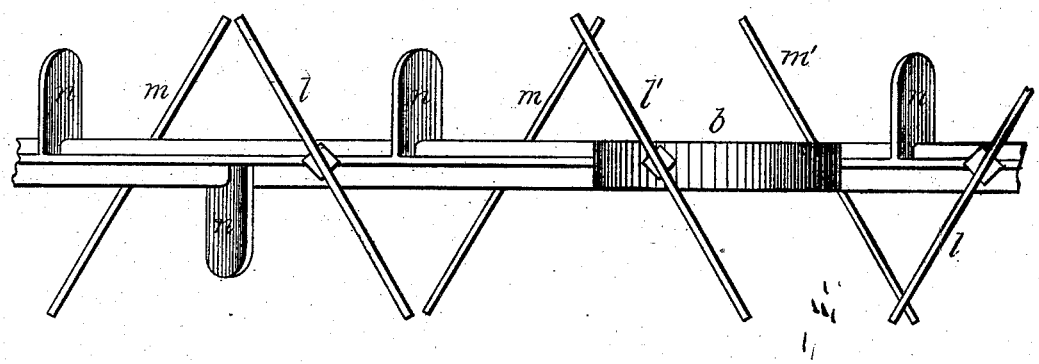
Figure 7:
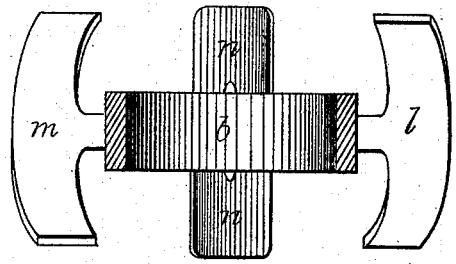

In Figs. 5, 6, and 7 of the drawings the oblique counter-disposed series of vanes are shown as composed in the form generally of two interrupted spiral or screw threads encircling the shaft B, and disposed adjacent to the inner circumference of the generator, these spiral threads being isolated from the shaft by radial arms which connect the two. In this instance each spiral thread is composed of sectional vanes $l l$, &c., $m m$, &c., and the vanes of one series are disposed alternately with the spaces between the vanes of the other set upon opposite sides of the shaft B, as shown in Figs. 5 and 6, and these vanes so arranged tend to force the liquid in the generator from one end to the other thereof about its inner circumference, as hereinbefore explained in reference to the vanes $f g$.

To effect a counter-current axially of the generator, I employ, in addition to the two interrupted spiral threads above explained, a series of shorter ears or blades, $n n$, &c., secured to and radiating from the shaft B, these blades being disposed obliquely to the axis of the shaft in a direction opposite to that taken by the sectoral vanes *l* and *m*. Under these circumstances the liquid contents impelled toward one end of the generator are returned in an opposite direction along the axis of the generator, as shown in the diagram Fig. 8, the course of the current being practically in a spiral path about the generator and shaft, as therein shown. In this instance, also, I prefer that an idle space shall exist between the active influences of the vanes *l m* and the blades *n* for reasons before explained. To produce an action in this instance similar to that performed by the V-shaped beak shown in Figs. 2, 3, and 4 of the drawings, I arrange two of the vanes *l m* in such relation to each other that they shall (though upon opposite sides of the shaft B) constitute, when the agitator is in rotation, a practically similarly-shaped beak for the same purpose. In Figs. 4 and 5 of the drawings these two vanes, which constitute in effect the V-shaped beak, are shown at *l' m'*, respectively, as the two nearest the opening *b* of the shaft B.

Having thus explained the nature and operation of my invention, I claim as my invention the following:

1. A rotary agitator or mixer for generators or receivers of aerated-water apparatus, containing, in combination with a suitable shaft, two series of vanes arranged obliquely in opposite directions to the axis of such shaft, one set being situated near the circumference of the generator and the other adjacent to the axis or shaft thereof, for purposes stated.

2. A rotary agitator for generators or receivers of aerated-water apparatus, containing a V or approximately so shaped beak to spread and disseminate the acid liquid admitted to the water in said generator.

3. In agitators for generators or receivers of aerated-water apparatus, two series of vanes disposed in obliquely-opposite planes with respect to the axis of such generator and the agitator-shaft, with a space intermediate between the oppositely-inclined portions of the vanes.

4. In agitators for generators or receivers of aerated-water apparatus, the combination, with the agitator-shaft and two sectional threads spirally surrounding such shaft, and adapted to rotate in close proximity to the inner circumference of the generator, of a series of radial blades secured to such shaft and operating in proximity to the axis of the latter, substantially for purposes stated.

5. An agitator for generators or receivers of aerated-water apparatus, consisting, in combination with a suitable shaft, of two barred wings disposed upon diagonally-opposite sides of such shaft, when the individual vanes of these wings are composed of two portions disposed in obliquely-opposite directions peripherally of the shaft, substantially as explained.

6. An agitator for generators or receivers of aerated-water apparatus, consisting in the combination, with a suitable shaft having an inclosure to receive the acid, as stated, of a barred wing upon the end of the shaft most remote from said inclosure, and a V or approximately shaped beak arranged in close proximity to such inclosure, essentially as and for purposes stated.

In testimony whereof I affix my signature in presence of two witnesses.

ALVIN DAVIS PUFFER.

Witnesses:
H. E. LODGE,
F. CURTIS.